(12) United States Patent
Miyazaki

(10) Patent No.: US 10,068,709 B2
(45) Date of Patent: Sep. 4, 2018

(54) ELECTRONIC COMPONENT AND METHOD FOR MANUFACTURING THE SAME

(71) Applicant: Murata Manufacturing Co., Ltd., Nagaokakyo-shi, Kyoto-fu (JP)

(72) Inventor: Toshiki Miyazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 41 days.

(21) Appl. No.: 15/204,005

(22) Filed: Jul. 7, 2016

(65) Prior Publication Data

US 2017/0011852 A1    Jan. 12, 2017

(30) Foreign Application Priority Data

Jul. 9, 2015 (JP) ................... 2015-137852

(51) Int. Cl.
  *H01G 4/30* (2006.01)
  *H01G 4/12* (2006.01)
  *H01G 4/005* (2006.01)
  *H01G 4/248* (2006.01)
  *H01G 4/008* (2006.01)
  *H01G 4/232* (2006.01)

(52) U.S. Cl.
  CPC .............. *H01G 4/30* (2013.01); *H01G 4/005* (2013.01); *H01G 4/0085* (2013.01); *H01G 4/1227* (2013.01); *H01G 4/2325* (2013.01); *H01G 4/248* (2013.01)

(58) Field of Classification Search
  CPC ........ H01G 4/30; H01G 4/005; H01G 4/1227; H01G 4/248
  See application file for complete search history.

(56) References Cited

U.S. PATENT DOCUMENTS

| | | | | |
|---|---|---|---|---|
| 5,356,474 A | * | 10/1994 | Savkar | ............... C23C 16/0227 118/715 |
| 2007/0227649 A1 | | 10/2007 | Onodera et al. | |
| 2007/0297119 A1 | | 12/2007 | Maegawa et al. | |
| 2010/0120607 A1 | | 5/2010 | Kim et al. | |

(Continued)

FOREIGN PATENT DOCUMENTS

| JP | 2004-79880 A | 3/2004 |
|---|---|---|
| JP | 2005-123407 A | 5/2005 |

(Continued)

OTHER PUBLICATIONS

Official Communication issued in Korean Patent Application No. 10-2016-0085929, dated May 2017.

*Primary Examiner* — Dion R Ferguson

(74) *Attorney, Agent, or Firm* — Keating & Bennett, LLP

(57) ABSTRACT

A method for manufacturing an electronic component includes preparing a rectangular or substantially rectangular parallelepiped multilayer body made of dielectric ceramic containing Ti and Ba. The multilayer body includes inner electrodes embedded therein, a pair of opposite end surfaces, and four side surfaces connecting the end surfaces to each other. The method further includes forming an oleophobic coating film containing BaF on the surface of the multilayer body, and immersing the end surfaces of the multilayer body having the coating film formed thereon into a conductive paste having a viscosity of about 15 Pa·s or less.

19 Claims, 19 Drawing Sheets

(56) References Cited

U.S. PATENT DOCUMENTS

| | | | |
|---|---|---|---|
| 2011/0273056 A1* | 11/2011 | Mizuno | H01G 4/2325 |
| | | | 310/311 |
| 2014/0254064 A1 | 9/2014 | Miyazaki | |
| 2015/0116899 A1 | 4/2015 | Kayatani et al. | |
| 2016/0059263 A1* | 3/2016 | Shimizu | H01G 13/006 |
| | | | 156/293 |
| 2016/0099106 A1* | 4/2016 | Kurokawa | H01G 4/0085 |
| | | | 361/301.4 |

FOREIGN PATENT DOCUMENTS

| | | |
|---|---|---|
| JP | 2005-197530 A | 7/2005 |
| JP | 2005-228904 A | 8/2005 |
| JP | 2007-67026 A | 3/2007 |
| JP | 2007-266208 A | 10/2007 |
| JP | 2013-091599 A | 5/2013 |
| JP | 2014-197666 A | 10/2014 |
| JP | 2015-111652 A | 6/2015 |
| KR | 10-1247228 B1 | 3/2013 |
| WO | 2006/126333 A1 | 11/2006 |

* cited by examiner

| VISCOSITY OF CONDUCTIVE PASTE (Pa·s) | | | SAMPLE 1 | SAMPLE 2 | SAMPLE 3 | SAMPLE 4 |
|---|---|---|---|---|---|---|
| | | | 5 | | 15 | |
| COATING FILM | | | ABSENT | PRESENT | ABSENT | PRESENT |
| OBSERVATION PICTURE OF L-W PLANE | | | | | | |
| LENGTH OF OUTER ELECTRODE (mm) | AVE | | 0.324 | 0.187 | 0.275 | 0.182 |
| | MAX | | 0.339 | 0.192 | 0.282 | 0.187 |
| | MIN | | 0.319 | 0.179 | 0.269 | 0.178 |
| | R | | 0.020 | 0.013 | 0.013 | 0.009 |
| DIFFERENCE IN RISING AMOUNT (mm) | AVE | | 0.097 | 0.006 | 0.071 | 0.004 |
| | MAX | | 0.105 | 0.010 | 0.075 | 0.007 |
| | MIN | | 0.089 | 0.003 | 0.068 | 0.001 |
| | R | | 0.016 | 0.007 | 0.007 | 0.005 |

ELECTRONIC COMPONENT AND METHOD FOR MANUFACTURING THE SAME

CROSS REFERENCE TO RELATED APPLICATION

The present application claims priority under 35 U.S.C. § 119 to Japanese Application No. 2015-137852 filed on Jul. 9, 2015 the entire contents of which are incorporated herein by reference.

BACKGROUND OF THE INVENTION

1. Field of the Invention

The present invention relates to an electronic component and a method for manufacturing the same, and specifically relates to an electronic component mounted by soldering and a method for manufacturing the same.

2. Description of the Related Art

As a prior document that discloses a method for forming outer electrodes of an electronic chip component, Japanese Unexamined Patent Application Publication No. 2007-266208 is known. According to the method for forming the outer electrodes of the electronic chip component described in Japanese Unexamined Patent Application Publication No. 2007-266208, chips are bonded to an adhesive sheet, and end surfaces of the chips are immersed into a conductive paste to form a pair of outer electrodes.

In recent years, electronic components such as multilayer ceramic capacitors are required to be large in capacitance and small in size. In order to increase the capacitance of the multilayer ceramic capacitor while reducing its size, it is conceivable to thicken a multilayer body, while thinning outer electrodes, to increase the number of layers of inner electrodes and thereby increasing opposite areas of the inner electrodes.

To thin the outer electrodes, a low-viscosity conductive paste that is easy to separate from the multilayer body may be applied to end surfaces of the multilayer body. However, when the end surfaces of the multilayer body are immersed into the low-viscosity conductive paste, the conductive paste tends to rise on side surfaces of the multilayer body in a short time due to surface tension. Thus, it is difficult to adjust the amount of the conductive paste rising on the end surfaces, causing variations in the shape of the two outer electrodes formed by immersion of both the end surfaces.

The low-viscosity conductive paste rises by different amounts between a middle portion and a ridge portion in each side surface of the multilayer body. To be more specific, the more distant from the ridge portions, the higher the conductive paste rises on the side surface of the multilayer body. Thus, when the outer electrodes are formed by immersing both the end surfaces of the multilayer body into the low-viscosity conductive paste, each outer electrode tends to have a substantially arc shape in a side view in a portion situated on the side surface of the multilayer body at an edge on an opposite side from the end surface of the multilayer body.

In general, the electronic component is mounted on a printed circuit board by soldering, while establishing correspondences between the pair of outer electrodes and a pair of lands provided in the printed circuit board.

In a case where the amount of the rising conductive paste varies and the pair of outer electrodes have asymmetrical shapes, upon soldering the electronic component, a tensile stress applied to the electronic component may lose its balance, owing to thermal shrinkage of a solder fillet. A tombstone phenomenon in which one of the pair of outer electrodes comes off the printed wiring board and the electronic component is erected on the printed circuit board may occur.

Also, in a case where the outer electrodes are each substantially in the arc shape in the side view in the portion situated on the side surface of the multilayer body at the edge on the opposite side from the end surface of the multilayer body, since the tensile stress caused by the distortion of the printed circuit board on which the electronic component is mounted concentrates on the ridge portions, cracks may occur in the multilayer body.

SUMMARY OF THE INVENTION

Considering the problems described above, preferred embodiments of the present invention provide an electronic component having outer electrodes that are each not arc-shaped or substantially arc-shaped but are linear-shaped or substantially linear-shaped in a side view at an edge on an opposite side from an end surface of a multilayer body and are well balanced with each other in shape, and a method for manufacturing the electronic component.

According to a preferred embodiment of the present invention, an electronic component includes a rectangular or substantially rectangular parallelepiped multilayer body and two outer electrodes. The multilayer body is made of dielectric ceramic containing Ti and Ba. The multilayer body has inner electrodes embedded therein, a pair of opposite end surfaces, and four side surfaces connecting the end surfaces to each other. The two outer electrodes are provided on the pair of end surfaces, respectively, and electrically connected to the inner electrodes. At least a portion of an exposed portion of each of the four side surfaces between the outer electrodes is covered with a coating film containing BaF.

According to a preferred embodiment of the present invention, the whole of the exposed portion of each of the four side surfaces between the outer electrodes is covered with the coating film.

According to a preferred embodiment of the present invention, the coating film is made of a polymer in which monomers of CF, $CF_2$, $CF_3$, and BaF are polymerized.

According to a preferred embodiment of the present invention, the BaF is detected as $BaF^+$ by time-of-flight secondary ion mass spectrometry.

According to a preferred embodiment of the present invention, the CF is detected as $CF^+$, the $CF_2$ is detected as $CF_2^+$, and the $CF_3$ is detected as $CF_3^+$ by the time-of-flight secondary ion mass spectrometry. The $BaF^+$ is detected more than each of the $CF^+$, the $CF_2^+$, and the $CF_3^+$.

According to a preferred embodiment of the present invention, the $CF_3^+$ is detected more than each of the $CF^+$ and the $CF_2^+$.

According to a preferred embodiment of the present invention, a method for manufacturing an electronic component includes the steps of preparing a rectangular or substantially rectangular parallelepiped multilayer body made of dielectric ceramic containing Ti and Ba, the multilayer body having inner electrodes embedded therein, a pair of opposite end surfaces, and four side surfaces connecting the end surfaces to each other; forming an oleophobic coating film containing BaF on the surface of the multilayer body; and immersing the end surfaces of the multilayer body having the coating film formed thereon into a conductive paste having a viscosity of about 15 Pa·s or less.

According to a preferred embodiment of the present invention, a fluorocarbon gas is used as a coating agent in the step of forming the coating film.

According to a preferred embodiment of the present invention, the conductive paste contains an alcohol organic solvent as a solvent.

According to a preferred embodiment of the present invention, the conductive paste further contains a glass component of about 30 volume % or more.

According to a preferred embodiment of the present invention, the outer electrodes of the electronic component are each thin and not arc-shaped or substantially arc-shaped but are linear-shaped or substantially linear shaped in a side view at an edge on an opposite side from the end surface of the multilayer body, thus maintaining a balance between the outer electrodes in shape.

According to a preferred embodiment of the present invention, an electronic component includes a rectangular or substantially rectangular parallelepiped multilayer body and two outer electrodes. The multilayer body is made of dielectric ceramic containing Ti and Ba. The multilayer body has inner electrodes embedded therein, a pair of opposite end surfaces, and four side surfaces connecting the end surfaces to each other. The two outer electrodes are provided on the pair of end surfaces, respectively, and electrically connected to the inner electrodes. At least a portion of an exposed portion of each of the four side surfaces between the outer electrodes is covered with BaF.

According to a preferred embodiment of the present invention, the entirety of the exposed portion of each of the four side surfaces between the outer electrodes is covered with the BaF.

According to a preferred embodiment of the present invention, the at least the portion of the exposed portion is covered with a coating film that is made of a polymer in which monomers of CF, $CF_2$, $CF_3$, and the BaF are polymerized.

According to a preferred embodiment of the present invention, the BaF is detected as $BaF^+$ by time-of-flight secondary ion mass spectrometry.

According to a preferred embodiment of the present invention, the CF is detected as $CF^+$, the $CF_2$ is detected as $CF_2^+$, and the $CF_3$ is detected as $CF_3^+$ by the time-of-flight secondary ion mass spectrometry. The $BaF^+$ is detected more than each of the $CF^+$, the $CF_2^+$, and the $CF_3^+$.

According to a preferred embodiment of the present invention, the $CF_3^+$ is detected more than each of the $CF^+$ and the $CF_2^+$.

According to a preferred embodiment of the present invention, the electronic component is one of a multilayer ceramic capacitor, a piezoelectric component, a thermistor, and an inductor.

According to a preferred embodiment of the present invention, the dielectric ceramic has a perovskite structure.

According to a preferred embodiment of the present invention, each of the outer electrodes includes a base electrode layer and a plating layer.

According to a preferred embodiment of the present invention, the plating layer includes a Ni plating layer and a Sn plating layer.

According to a preferred embodiment of the present invention, a method for manufacturing an electronic component includes the steps of preparing a rectangular or substantially rectangular parallelepiped multilayer body made of dielectric ceramic containing Ti and Ba, the multilayer body having inner electrodes embedded therein, a pair of opposite end surfaces, and four side surfaces connecting the end surfaces to each other; forming an oleophobic coating containing BaF on the surface of the multilayer body; and immersing the end surfaces of the multilayer body having the oleophobic coating formed thereon into a conductive paste having a viscosity of about 15 Pa·s or less.

According to a preferred embodiment of the present invention, a fluorocarbon gas is used as a coating agent in the step of forming the coating.

According to a preferred embodiment of the present invention, the conductive paste contains an alcohol organic solvent as a solvent.

According to a preferred embodiment of the present invention, the conductive paste further contains a glass component of about 30 volume % or more.

According to a preferred embodiment of the present invention, the oleophobic coating is a film that is made of a polymer in which monomers of CF, $CF_2$, $CF_3$, and the BaF are polymerized.

According to a preferred embodiment of the present invention, the BaF is detected as $BaF^+$ by time-of-flight secondary ion mass spectrometry.

According to a preferred embodiment of the present invention, the CF is detected as $CF^+$, the $CF_2$ is detected as $CF_2^+$, and the $CF_3$ is detected as $CF_3^+$ by the time-of-flight secondary ion mass spectrometry, and the $BaF^+$ is detected more than each of the $CF^+$, the $CF_2^+$, and the $CF_3^+$.

According to a preferred embodiment of the present invention, the $CF_3^+$ is detected more than each of the $CF^+$ and the $CF_2^+$.

According to a preferred embodiment of the present invention, the electronic component is one of a multilayer ceramic capacitor, a piezoelectric component, a thermistor, and an inductor.

According to a preferred embodiment of the present invention, two outer electrodes are formed on the pair of end surfaces. At least a portion of an exposed portion of each of the four side surfaces between the outer electrodes is covered with the oleophobic coating.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
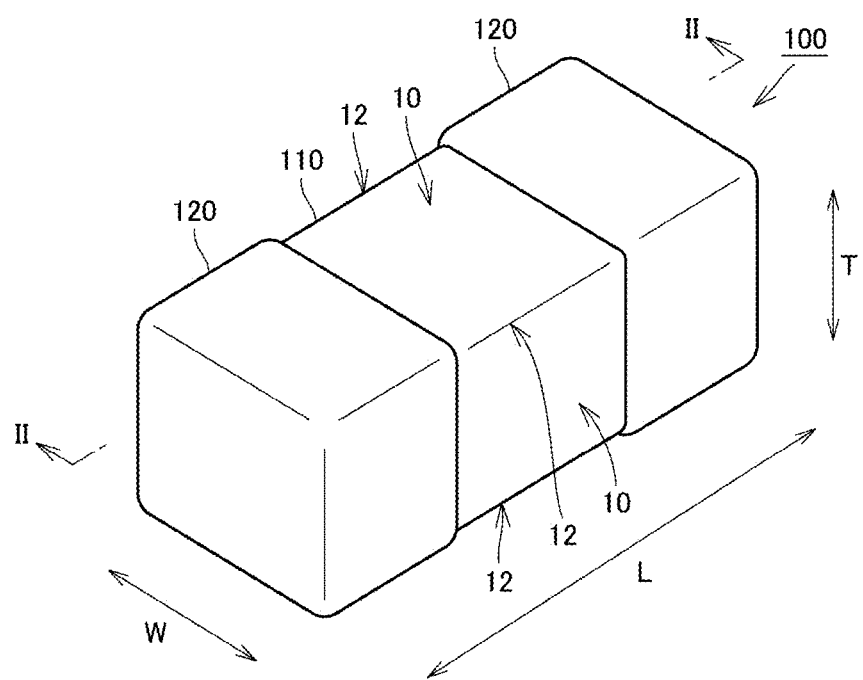
FIG. 1 is a perspective view showing the appearance of a multilayer ceramic capacitor according to a preferred embodiment of the present invention.

Electronic components and methods for manufacturing electronic components according to preferred embodiments of the present invention will be described below with reference to the drawings. In the following description of the preferred embodiments, the same or corresponding components are indicated with the same numerical numbers in the drawings, and the description thereof will not be repeated. The following description takes a multilayer ceramic capacitor as an example of the electronic component, but the electronic component may be a piezoelectric component, a thermistor, an inductor, or the like, instead of the capacitor.

Figure 2:
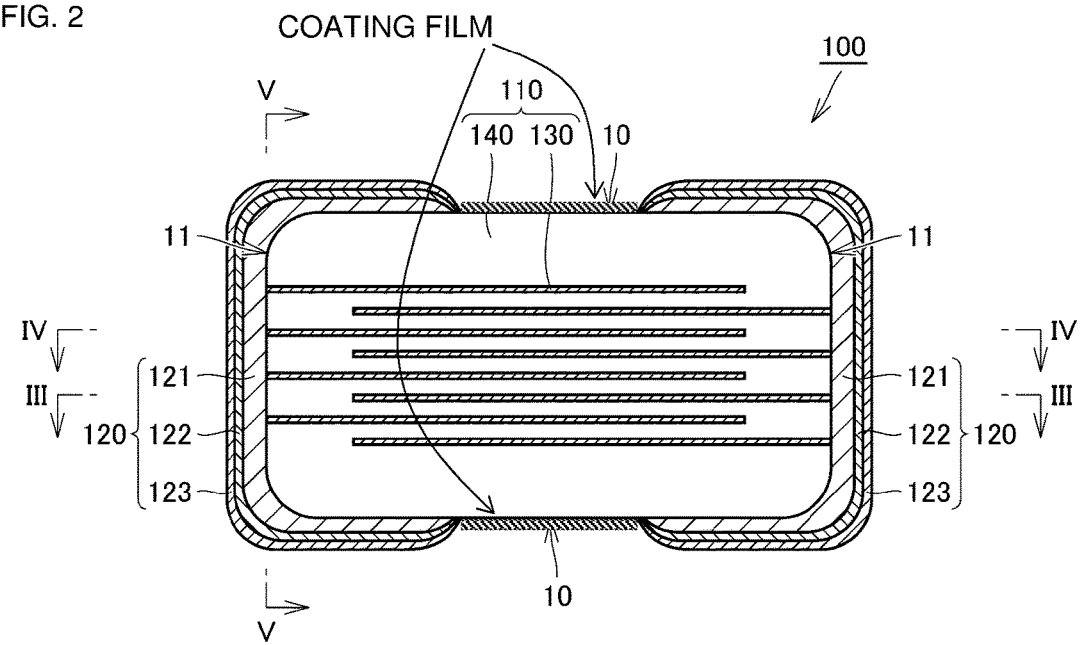
FIG. 2 is a sectional view of the multilayer ceramic capacitor taken on a line II-II in FIG. 1.
Figure 3:
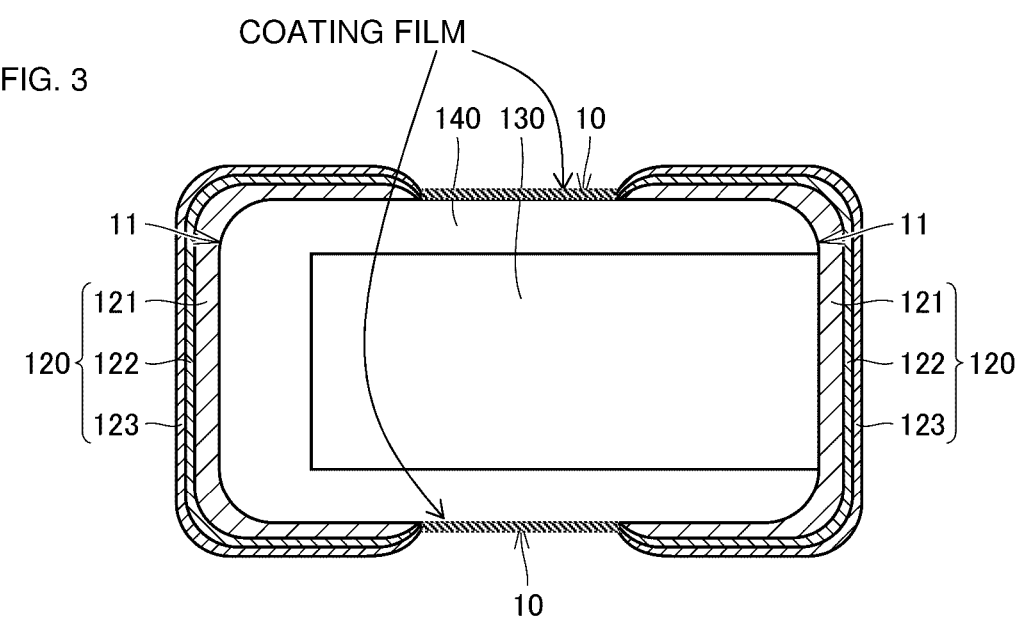
FIG. 3 is a sectional view of the multilayer ceramic capacitor taken on a line III-III in FIG. 2.
Figure 4:
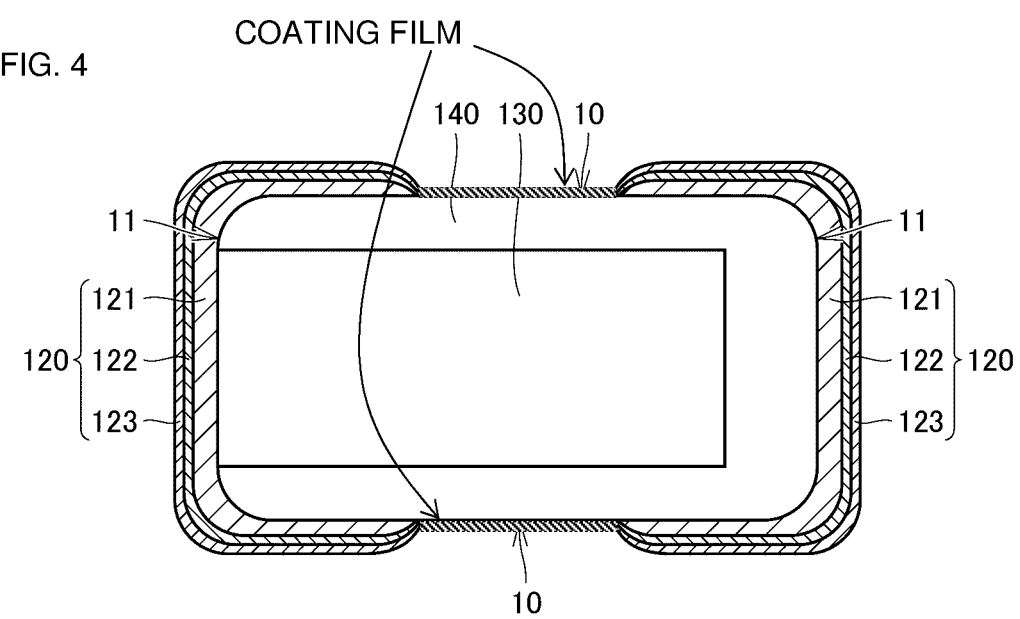
FIG. 4 is a sectional view of the multilayer ceramic capacitor taken on a line IV-IV in FIG. 2.
Figure 5:
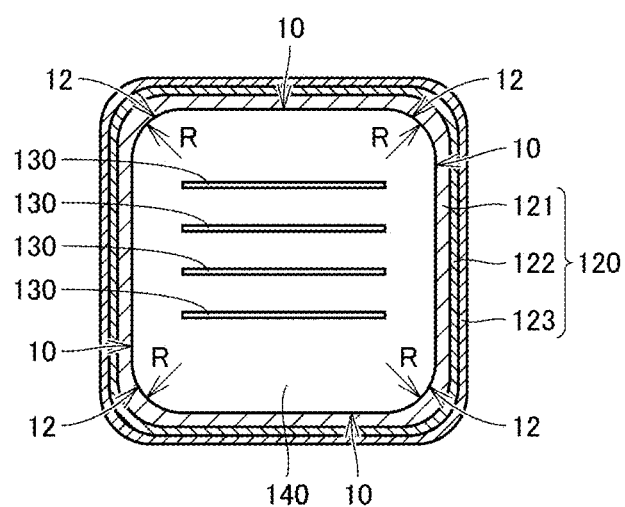
FIG. 5 is a sectional view of the multilayer ceramic capacitor taken on a line V-V in FIG. 2.

FIG. 1 is a perspective view showing the appearance of a multilayer ceramic capacitor according to a preferred embodiment of the present invention. FIG. 2 is a sectional view of the multilayer ceramic capacitor taken on a line II-II in FIG. 1. FIG. 3 is a sectional view of the multilayer ceramic capacitor taken on a line III-III in FIG. 2. FIG. 4 is a sectional view of the multilayer ceramic capacitor taken on a line IV-IV in FIG. 2. FIG. 5 is a sectional view of the multilayer ceramic capacitor taken on a line V-V in FIG. 2. In FIG. 1, L represents a length direction of a multilayer body, W represents a width direction of the multilayer body, and T represents a thickness direction of the multilayer body.

As shown in FIGS. 1 to 5, a multilayer ceramic capacitor 100 according to a preferred embodiment of the present invention is made of dielectric ceramic in which inner electrodes 130 are embedded. The multilayer ceramic capacitor 100 includes an rectangular or substantially rectangular parallelepiped multilayer body 110 that includes a pair of opposed end surfaces 11 and four side surfaces 10 connecting the end surfaces 11 to each other, and two outer electrodes 120 that are provided on the pair of end surfaces 11 on a one-to-one basis and connected to the inner electrodes 130. At least a portion of an exposed portion of each of the four side surfaces 10 between the outer electrodes 120 is covered with a coating film containing BaF. The whole of the exposed portion of each of the four side surfaces 10 between the outer electrodes 120 is preferably covered with the coating film containing the BaF. Note that, the film containing the BaF may be provided in at least a portion between the multilayer body 110 and the outer electrode 120.

In this preferred embodiment, the pair of end surfaces of the multilayer body 110 are perpendicular or substantially perpendicular to the length direction L of the multilayer body 110. However, the pair of end surfaces of the multilayer body 110 may be perpendicular or substantially perpendicular to the width direction W of the multilayer body 110, or the thickness direction T of the multilayer body 110. Corner portions and ridge portions 12 of the multilayer body 110 are rounded. The ridge portion 12 is arc-shaped or approximately arc-shaped having a radius R of curvature in a cross section perpendicular or substantially perpendicular to the length direction L of the multilayer body 110. The radius R of curvature can be measured by exposing a W-T section, which is parallel or substantially parallel to both of the width direction W and the thickness direction T of the multilayer ceramic capacitor 100, by grinding and subjecting the W-T section to image processing. Note that, the radius R of curvature hardly changes between before and after forming the outer electrodes 120 on the multilayer body 110.

The approximate dimensions of the multilayer body 110 in the length direction L, the width direction W, and the thickness direction T are, for example, 1.0 mm×0.5 mm×0.5 mm, 0.6 mm×0.3 mm×0.3 mm, 0.4 mm×0.2 mm×0.2 mm, or 0.2 mm×0.1 mm×0.1 mm.

In the multilayer body 110, ceramic layers 140 made of dielectric ceramic and the plate-shaped or approximately plate-shaped inner electrodes 130 are alternately laminated. In the multilayer ceramic capacitor 100 according to this preferred embodiment, a lamination direction of the ceramic layers 140 and the inner electrodes 130 is perpendicular or substantially perpendicular to the length direction L of the multilayer body 110 and the width direction W of the multilayer body 110. In other words, the lamination direction of the ceramic layers 140 and the inner electrodes 130 is parallel or substantially parallel to the thickness direction T of the multilayer body 110. However, the lamination direction of the ceramic layers 140 and the inner electrodes 130 is not limited to above, and may be parallel or substantially parallel to the width direction W.

As a material for forming the ceramic layers 140, dielectric ceramic containing Ti and Ba and having a perovskite structure is available. More specifically, the material for forming the ceramic layers 140 may be composed mainly of $BaTiO_3$ and added with a Mn compound, a Co compound, a Si compound, a rare-earth compound, or the like.

As shown in FIG. 3, of the inner electrodes 130 that are opposed and adjacent to each other so as to sandwich the ceramic layer 140 therebetween, one of the inner electrodes 130 extends from an end portion on one side to the other end portion on the other side in the length direction of the multilayer body 110, and is connected to the outer electrode 120 at the end surface of the multilayer body 110 on one side.

As shown in FIG. 4, the other of the inner electrodes 130 extends from the end portion on the other side to the end portion on the one side in the length direction of the multilayer body 110, and is connected to the outer electrode 120 at the end surface of the multilayer body 110 on the other side.

As a material for forming the inner electrodes 130, a metal such as Ni, Cu, Ag, Pd, or Au, or an alloy containing at least one of these metals, e.g., an alloy of Ag and Pd is available.

The outer electrodes 120 each include a base electrode layer 121 provided on the surface of the multilayer body 110 and a plating layer that covers the base electrode layer 121. In this preferred embodiment, the base electrode layer 121 is provided on the surface of the multilayer body 110 so as to extend from each of the pair of end surfaces 11 to the four side surfaces 10. In each of the four side surfaces 10, the base electrode layers 121 are provided on the sides of both of the end surfaces 11.

As a material for forming the base electrode layers 121, a metal such as Ni, Cu, Ag, Pd, or Au, or an alloy containing at least one of these metals, e.g., an alloy of Ag and Pd is available.

As a material for forming the plating layers, a metal such as Ni, Sn, Cu, Ag, Pd, or Au, or an alloy containing at least one of these metals, e.g., an alloy of Ag and Pd is available.

In this preferred embodiment, each of the plating layers includes a Ni plating layer 122 and a Sn plating layer 123. The Ni plating layer 122 covers the base electrode layer 121. The Sn plating layer 123 covers the Ni plating layer 122. The Ni plating layer 122 defines and functions as a solder barrier layer. The Sn plating layer 123 improves wettability with solder, when being mounted.

A coating film that covers the surface of the multilayer body 110 between the outer electrodes 120 is made of a polymer in which monomers of CF, $CF_2$, $CF_3$, and BaF are polymerized. The Ba of the BaF contained in coating film, which coincides with the Ba of the dielectric ceramic used to form the ceramic layers 140. Since the Ba and F are firmly coupled, the coating film containing the polymer of the BaF firmly adheres to the surface of the multilayer body 110.

When analyzing the components of the coating film by time-of-flight secondary ion mass spectrometry (TOF-SIMS), the BaF, the $CF_3$, the CF, and the $CF_2$ are detected from the coating film in order of magnitude of BaF>$CF_3$>CF>$CF_2$. To be more specific, $Bi_3^{++}$ ions are irradiated as primary ions to a measurement area of about 300 μm×300 μm on the coating film with a primary ion energy of about 25 kV, and generated secondary ions are detected. As a result, the CF is detected as $CF^+$, the $CF_2$ is detected as $CF_2^+$, the $CF_3$ is detected as $CF_3^+$, and the BaF is detected as $BaF^+$. The secondary ions are detected in order of magnitude of $BaF^+$>$CF_3^+$>$CF^+$>$CF_2^+$.

Figure 6:
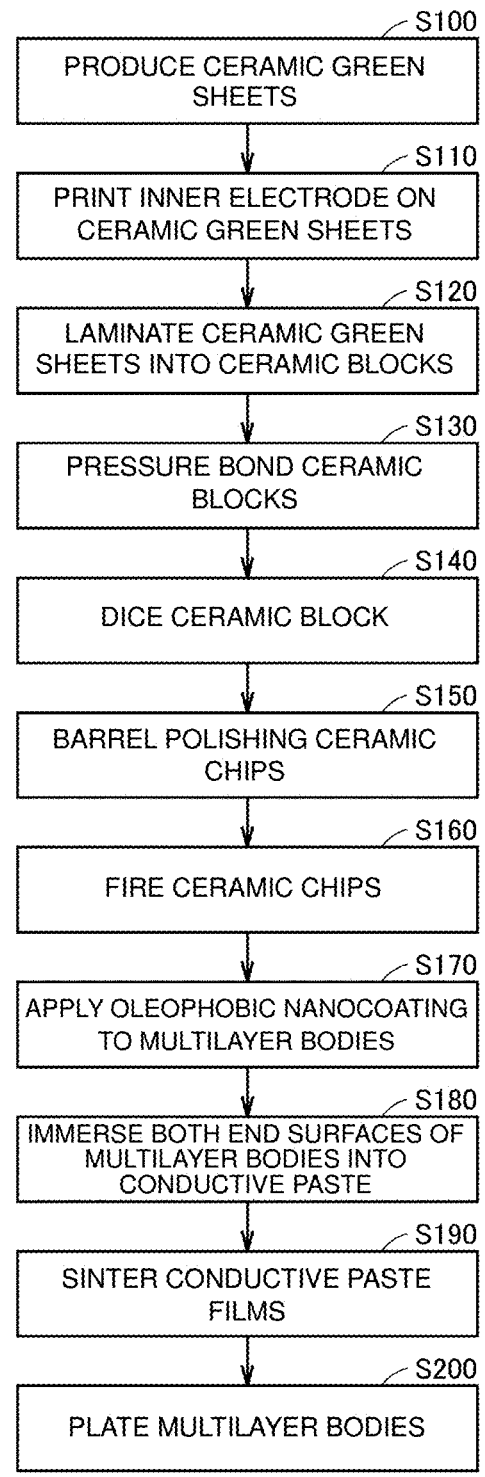
FIG. 6 is a flowchart of a method for manufacturing the multilayer ceramic capacitor according to a preferred embodiment of the present invention.

A method for manufacturing the multilayer ceramic capacitor according to a preferred embodiment of the present invention will be described below. FIG. 6 is a flowchart of the method for manufacturing the multilayer ceramic capacitor according to a preferred embodiment of the present invention.

As shown in FIG. 6, first, a ceramic paste that contains a dielectric ceramic powder containing Ti and Ba is applied in an approximately sheet form by a die coating method, a gravure coating method, a microgravure coating method, or the like and dried, to produce ceramic green sheets (S100).

A conductive paste for forming the inner electrodes is applied to a portion of the plurality of produced ceramic green sheets by a screen printing method, an inkjet printing method, a gravure printing method, or the like into a predetermined pattern (S110).

In this manner, the ceramic green sheets in which the conductive pattern to be the inner electrode is formed and the ceramic green sheets in which no conductive pattern is formed are prepared. Note that, the ceramic paste and the conductive paste used to form the inner electrodes may contain a well-known binder and catalyst.

A plurality of the ceramic green sheets having no conductive pattern are laminated, and hundreds of the ceramic green sheets having the conductive pattern are sequentially laminated thereon. Moreover, a plurality of the ceramic green sheets having no conductive pattern are laminated thereon to form ceramic blocks (S120).

After that, the ceramic blocks are bonded in a lamination direction by isostatic pressing, mold pressing, or the like (S130). Next, the bonded ceramic block is diced into a plurality of rectangular or substantially rectangular parallelepiped ceramic chips by a shearing method, a cutting method using sanders, or the like (S140).

The ceramic chips are subjected to barreling (S150) to round corner portions and ridge portions of the ceramic chips. The ridge portions have a radius R of curvature of, for example, about 10 μm.

The ceramic chips are degreased, and thereafter solidified by firing (S160) to form the multilayer bodies 110. A firing temperature is appropriately set in accordance with the kinds of a ceramic material and a conductive material, for example, in a range between about 900° C. and about 1300° C. inclusive.

In the rectangular or substantially rectangular parallelepiped multilayer body 110 prepared as described above, the inner electrodes 130 are embedded. The multilayer body 110 is made of the dielectric ceramic containing Ti and Ba. The multilayer body 110 includes the pair of opposite end surfaces 11 and the four side surfaces 10 that connect the end surfaces 11 to each other.

Next, an oleophobic nanocoating is applied to the multilayer bodies 110 (S170). To be more specific, the multilayer bodies 110 are exposed to a fluorocarbon gas, that is, a coating agent, to form an oleophobic coating film on the surface of the multilayer body 110. The fluorocarbon gas contains $CF_4$, $C_2F_6$, $C_3F_8$, $C_4F_8$, or the like. The above-described coating film contains BaF. More specifically, the above-described coating film is made of a polymer in which monomers of CF, $CF_2$, $CF_3$, and BaF are polymerized. Note that, the CF has a surface tension of approximately 6 mN/m, the $CF_2$ has a surface tension of approximately 6 mN/m, and the $CF_3$ has a surface tension of approximately 18 mN/m at a temperature of 20° C., for example.

After that, both end surfaces of the multilayer bodies 110 having the coating film formed thereon are immersed into a conductive paste for forming the outer electrodes (S180). The conductive paste for forming the outer electrodes has a viscosity between about 5 Pa·s and about 15 Pa·s inclusive, for example. The conductive paste used to form the outer electrodes contains a metal powder such as Ni, Cu, Ag, Pd, or Au, a glass frit, a binder, and a solvent. The conductive paste used to form the outer electrodes contains a glass component of about 30 volume % or more, for example. The solvent is an alcohol organic solvent such as terpineol. Terpineol has a surface tension of approximately 38 mN/m, for example.

Figure 7:
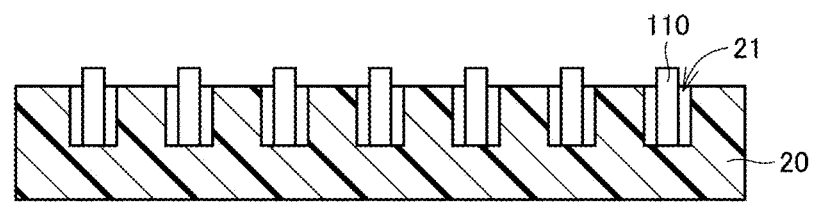
FIG. 7 is a sectional view showing a state in which a plurality of multilayer bodies are inserted into a plurality of recesses of a support member.

An example of a method for immersion-applying the conductive paste used to form the outer electrodes to the multilayer bodies 110 will be described. FIG. 7 is a sectional view showing a state in which a plurality of multilayer bodies are inserted into a plurality of recesses of a support member. As shown in FIG. 7, the plurality of multilayer bodies 110 are inserted into a plurality of recesses 21 of a support member 20. Each multilayer body 110 contacts the bottom surface of the recess 21 at one of the end surfaces, and protrudes from the recess 21 at the other of the end surfaces.

As described above, although the surface of the multilayer body 110 is covered with the coating film, the coating film containing the BaF firmly adheres to the surface of the multilayer body 110. Therefore, the coating film does not peel off, when the multilayer body 110 is inserted into the recess 21 of the support member 20.

Figure 8:
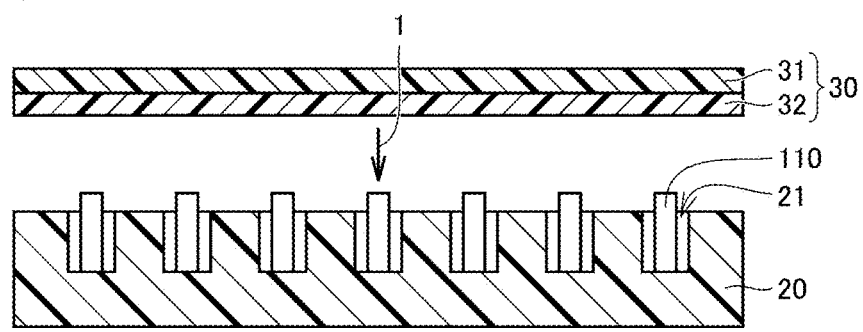
FIG. 8 is a sectional view showing a state in which an adhesive jig is approaching end surfaces of the multilayer bodies.

FIG. 8 is a sectional view showing a state in which an adhesive jig is approaching the other end surfaces of the multilayer bodies. As shown in FIG. 8, an adhesive jig 30, which includes a flat plate 31 and an adhesive portion 32 provided on the bottom surface of the flat plate 31, is brought down as shown by an arrow 1 so as to approach the support member 20.

Figure 9:
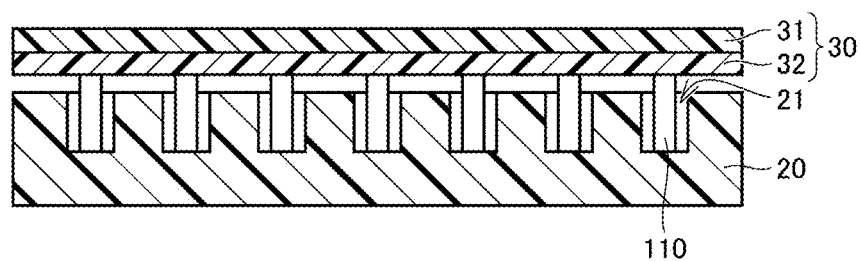
FIG. 9 is a sectional view showing a state in which an adhesive portion of the adhesive jig is pressed against the end surfaces of the multilayer bodies.

FIG. 9 is a sectional view showing a state in which the adhesive portion of the adhesive jig is pressed against the other end surfaces of the multilayer bodies. As shown in FIG. 9, the adhesive portion 32 of the adhesive jig 30 is pressed against the other end surfaces of the multilayer bodies 110, to make the multilayer bodies 110 adhere to the adhesive jig 30.

Figure 10:
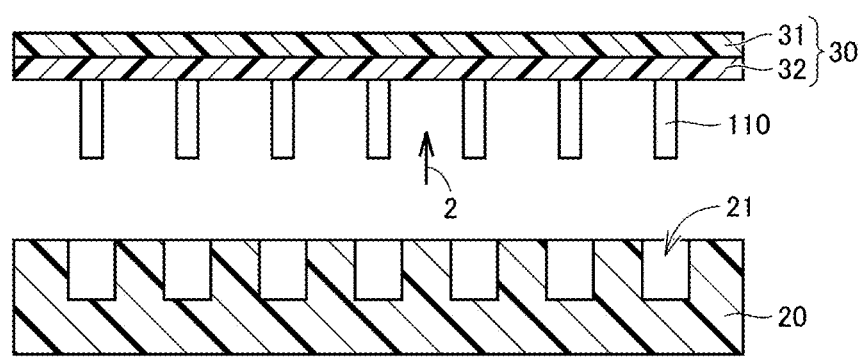
FIG. 10 is a sectional view showing a state in which the multilayer bodies are lifted up from the support member using the adhesive jig.

FIG. 10 is a sectional view showing a state in which the multilayer bodies are lifted up from the support member using the adhesive jig. As shown in FIG. 10, the adhesive jig 30 is brought up as shown by an arrow 2, to lift up the multilayer bodies 110 from the recesses 21 of the support member 20.

Figure 11:
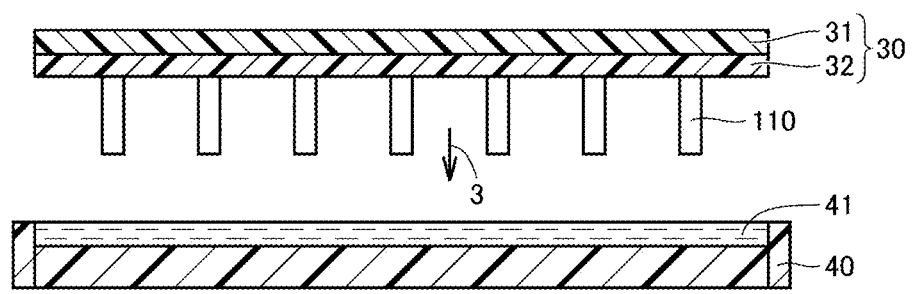
FIG. 11 is a sectional view showing a state in which the multilayer bodies supported by the adhesive jig are approaching a conductive paste for forming outer electrodes.

FIG. 11 is a sectional view showing a state in which the multilayer bodies supported by the adhesive jig are approaching the conductive paste used to form the outer electrodes. As shown in FIG. 11, the adhesive jig 30 is brought down as shown by an arrow 3 to make the end surfaces of the multilayer bodies 110 on one side approach the conductive paste 41 that fills a container 40.

Figure 12:
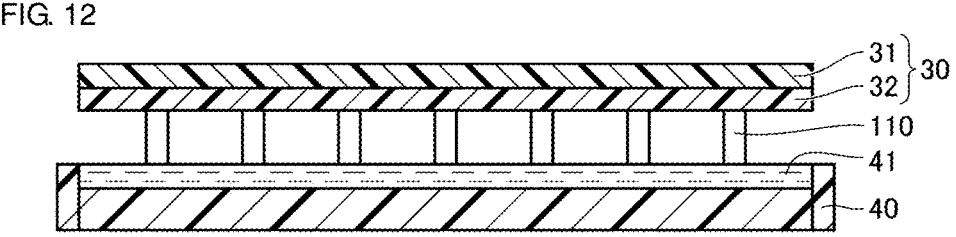
FIG. 12 is a sectional view showing a state in which the other end surfaces of the multilayer bodies are immersed into the conductive paste.

FIG. 12 is a sectional view showing a state in which the end surfaces of the multilayer bodies on one side are immersed into the conductive paste. As shown in FIG. 12, the adhesive jig 30 presses the multilayer bodies 110 against the container 40 so as to catch the multilayer bodies 110 between the adhesive portion 32 of the adhesive jig 30 and the bottom surface of the container 40. Thus, a conductive paste 41 is applied to the side surfaces of the multilayer bodies 110 by a length corresponding to the filling height of the conductive paste 41 in the container 40.

Since the surface of the multilayer body 110 is covered with the oleophobic coating film having a lower surface tension than the alcohol organic solvent contained in the conductive paste 41, it is difficult for the conductive paste 41 to rise on the side surfaces 10 of the multilayer body 110. Thus, it is possible to reduce variations in the amount of the rising conductive paste 41.

Figure 13:
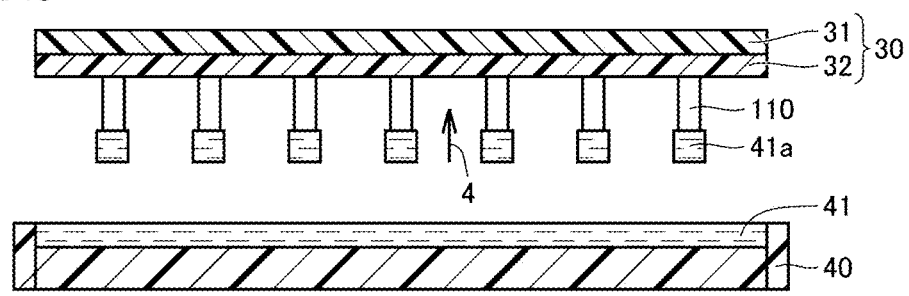
FIG. 13 is a sectional view showing a state in which the multilayer bodies are lifted up from a container using the adhesive jig.

FIG. 13 is a sectional view showing a state in which the multilayer bodies are lifted up from the container using the adhesive jig. As shown in FIG. 13, the adhesive jig 30 is brought up as shown by an arrow 4 to lift up the multilayer bodies 110 from the conductive paste 41. As a result, the conductive paste 41a adheres to the end surfaces of the multilayer bodies 110 on one side. In a like manner, the conductive paste 41a adheres to the end surfaces of the multilayer bodies 110 on the other side.

The multilayer bodies 110 in which the conductive paste 41a is applied are dried and heated to a temperature of the order of, for example, about 700° C. to sinter conductive paste films (S190). As a result, the base electrode layers 121 are formed by firing the conductive paste 41a onto the multilayer body 110. Note that, the multilayer body 110 and the base electrode layers 121 may be formed at the same time by firing the ceramic chips after the conductive paste 41a is applied thereto.

After that, the multilayer bodies 110 are plated (S200). The multilayer bodies 110 are subjected to electroplating, that is, Ni plating and Sn plating in this order, so that the Ni plating layer 122 and the Sn plating layer 123 are formed.

To be more specific, the Ni plating layer 122 is formed by a barrel plating method. A barrel that contains a plurality of the multilayer bodies 110 having the base electrode layers 121 formed thereon is rotated and energized, while being immersed in a plating solution in a plating bath, and therefore the Ni plating layer 122 is formed on the base electrode layer 121. In a like manner, the Sn plating layer 123 is formed on the Ni plating layer 122. Note that, only a Cu plating layer may be provided as the plating layer.

The multilayer ceramic capacitor 100 according to this preferred embodiment can be manufactured by the steps described above.

Figure 14:
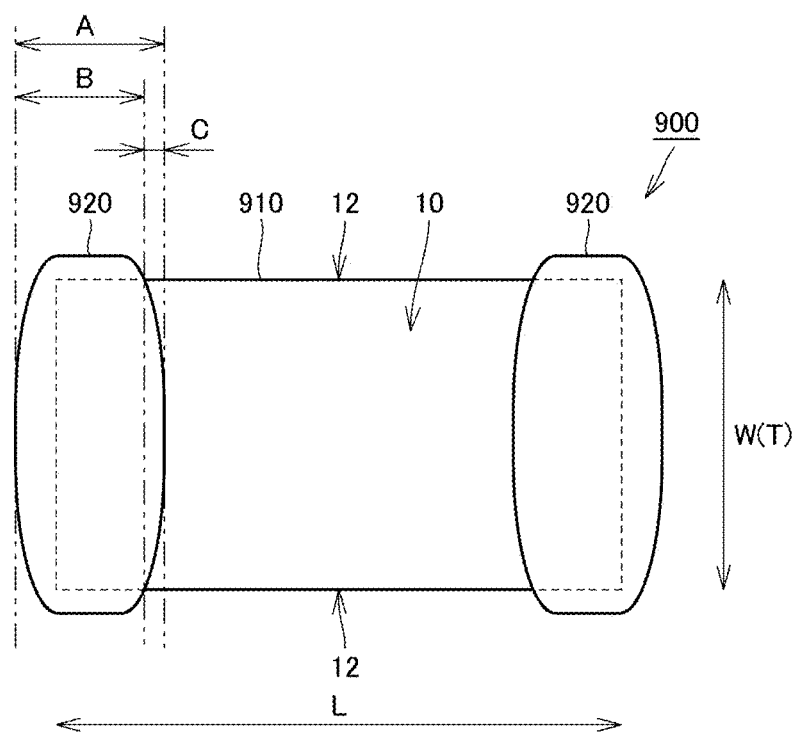
FIG. 14 is a plan view or a side view showing the appearance of a multilayer ceramic capacitor according to a comparative example.

An electronic component according to a comparative example in which outer electrodes are formed by immersion-applying a conductive paste to a multilayer body having no coating film will be described. FIG. 14 is a plan view or a side view showing the appearance of a multilayer ceramic capacitor according to the comparative example. As shown in FIG. 14, a multilayer ceramic capacitor 900 according to the comparative example includes a multilayer body 910 and two outer electrodes 920 provided on a pair of end surfaces.

Since the surface of the multilayer body 910 is not covered with the coating film, the conductive paste tends to rise on the side surfaces 10 of the multilayer body 910 in an uneven manner, thus causing variations in the amount of the rising conductive paste between a middle portion and a ridge portion of the side surface 10. As a result, an outer electrode 920 elongates with an increase in a distant from the ridge portions 12 in the side surface 10 of the multilayer body 910. The outer electrode 920 is arc-shaped or substantially arc-shaped in a side view at an edge on an opposite side from the end surface of the multilayer body 910. To be more specific, in the side surface 10 of the multilayer body 910, the length A of the outer electrode 920 is the longest at the middle portion that is the farthest from the ridge portions 12. The length B of the outer electrode 920 is the shortest at the ridge portions 12 of the multilayer body 910. The difference C between the lengths A and B of the outer electrode 920 is based on the difference in the amount of the rising conductive paste.

Figure 15:
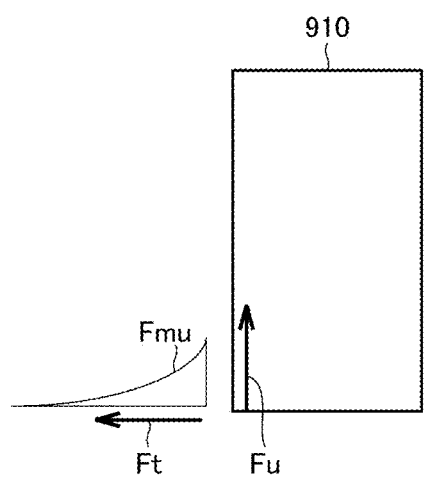
FIG. 15 is a drawing showing forces exerted on the conductive paste adhering to a side surface of the multilayer body.

A mechanism in which the conductive paste unevenly rises on the side surfaces 10 of the multilayer body 910 will be described. FIG. 15 is a drawing showing forces exerted on the conductive paste adhering to the side surface of the multilayer body. As shown in FIG. 15, a rising force Fu being likely to reduce surface free energy and a pulling force Ft caused by a surface tension of the multilayer body 910 are exerted on the conductive paste that is in contact with the side surface of the multilayer body 910. Since the rising force Fu decreases with an increase in the pulling force Ft, a rising force that is actually exerted on the conductive paste is represented by Fmu.

Figure 16:
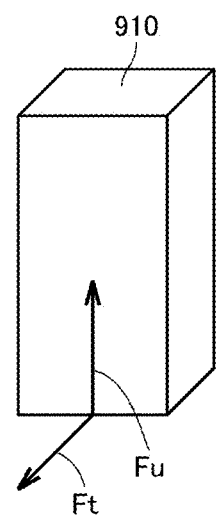
FIG. 16 is a drawing showing forces exerted on the conductive paste that contacts a middle portion of the side surface of the multilayer body, in a width direction and a thickness direction.
Figure 17:
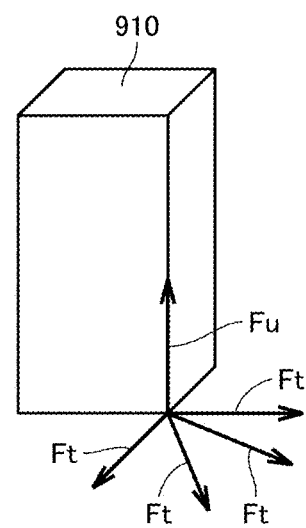
FIG. 17 is a drawing showing forces exerted on the conductive paste adhering to a ridge portion of the multilayer body.
Figure 18:
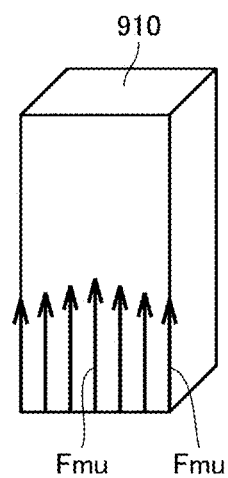
FIG. 18 is a drawing showing rising forces actually exerted on the conductive paste that contacts the side surface of the multilayer body.

FIG. 16 is a drawing showing forces exerted on the conductive paste that contacts the middle portion of the side surface of the multilayer body in the width direction and the thickness direction. FIG. 17 is a drawing showing forces exerted on the conductive paste that contacts the ridge portion of the multilayer body. FIG. 18 is a drawing showing the rising forces actually exerted on the conductive paste that contacts the side surface of the multilayer body.

As shown in FIGS. 16 and 17, a pulling force Ft exerted on the conductive paste that contacts the ridge portion of the multilayer body 910 is larger than a pulling force exerted on the conductive paste that contacts the middle portion of the side surface of the multilayer body 910 in the width direction and the thickness direction. This becomes more conspicuous as a reduction in the radius R of curvature of the ridge portion. As a result, as shown in FIG. 18, the rising force Fmu actually exerted on the conductive paste that contacts the side surface of the multilayer body 910 increases with an increase in distance from the ridge portion. That is to say, the conductive paste rises more easily on the middle portion of the side surface of the multilayer body 910 in the width direction and the thickness direction than on the ridge portion of the multilayer body 910. Thus, the conductive paste unevenly rises on the side surface 10 of the multilayer body 910.

In the multilayer ceramic capacitor 100 according to this preferred embodiment, the oleophobic coating film that covers the surface of the multilayer body 110 prevents the conductive paste from rising on the side surfaces 10 of the multilayer body 110. Thus, an uneven rise of the conductive paste is prevented or significantly reduced. Also, it is possible to prevent the pair of outer electrodes 120 from having asymmetrical shapes to each other. Since the coating film containing the BaF prevents itself from peeling off the surface of the multilayer body 110, and therefore the shape of the outer electrodes 120 is able to be stabilized while being thinned. As a result, the outer electrodes 120 of the multilayer ceramic capacitor 100 are each made thin and not arc-shaped or substantially arc-shaped but linear-shaped or substantially linear-shaped in a side view at the edge on the opposite side from the end surface of the multilayer body, thus serving to keep a balance between the outer electrodes 120 in shape.

EXPERIMENTAL EXAMPLE

An experimental example to verify the effects of the viscosity of the conductive paste for forming the outer electrodes and the presence or absence of the coating film on the shape of the outer electrodes will be described below. In this experimental example, ten samples per each of four types of multilayer ceramic capacitors were manufactured. In samples 1 and 2, a conductive paste for forming outer electrodes had a viscosity of about 5 Pa·s. In samples 3 and 4, a conductive paste for forming outer electrodes had a viscosity of about 15 Pa·s. The samples 1 and 3 had no coating film, while the samples 2 and 4 had a coating film.

Figure 19:
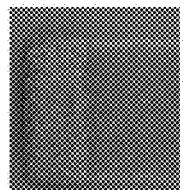
FIG. 19 is a table showing, as to samples 1 to 4, an observation picture of an L-W plane of the multilayer ceramic capacitor, the length of the outer electrode, and a difference in the amount of the rising conductive paste.

FIG. 19 is a table showing, as to each of the samples 1 to 4, an observation picture of an L-W plane of the multilayer ceramic capacitor, the length of the outer electrode, and a difference in the amount of the rising conductive paste. Note that, the length of the outer electrode corresponds to the dimension of the length A of the outer electrode as shown in FIG. 14. The difference in the amount of the rising conductive paste corresponds to the difference C between the lengths A and B of the outer electrode as shown in FIG. 14.

As shown in FIG. 19, in the samples 2 and 4 having the coating film, the difference in the amount of the rising conductive paste was about 0.01 mm or less, and therefore it was made sure that the conductive paste was suppressed from rising unevenly. It was also made sure that the pair of outer electrodes were suppressed from having asymmetrical shapes.

The preferred embodiments disclosed above are just examples in all aspects, and are not limited. The scope of the present invention is expressed not by the above description but by the scope of claims, and intended to include equivalent meanings to the scope of claims and all modifications within the scope of claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a rectangular or substantially rectangular parallelepiped multilayer body made of dielectric ceramic containing Ti and Ba, the multilayer body including inner electrodes embedded therein, a pair of opposite end surfaces, and four side surfaces connecting the end surfaces to each other; and
two outer electrodes provided on the pair of end surfaces, respectively, and electrically connected to the inner electrodes; wherein
at least a portion of an exposed portion of each of the four side surfaces between the outer electrodes is covered with BaF.

2. The electronic component according to claim 1, wherein an entirety of the exposed portion of each of the four side surfaces between the outer electrodes is covered with the BaF.

3. The electronic component according to claim 1, wherein the BaF is included in a coating film that is made of a polymer in which monomers of CF, $CF_2$, $CF_3$, and the BaF are polymerized.

4. The electronic component according to claim 3, wherein the BaF is detected as $BaF^+$ by time-of-flight secondary ion mass spectrometry.

5. The electronic component according to claim 4, wherein
the CF is detected as $CF^+$, the $CF_2$ is detected as $CF_2^+$, and the $CF_3$ is detected as $CF_3^+$ by the time-of-flight secondary ion mass spectrometry; and
the $BaF^+$ is detected more than each of the $CF^+$, the $CF_2^+$, and the $CF_3^+$.

6. The electronic component according to claim 5, wherein the $CF_3^+$ is detected more than each of the $CF^+$ and the $CF_2^+$.

7. The electronic component according to claim 1, wherein the electronic component is one of a multilayer ceramic capacitor, a piezoelectric component, a thermistor, and an inductor.

8. The electronic component according to claim 1, wherein the dielectric ceramic has a perovskite structure.

9. The electronic component according to claim 1, wherein each of the outer electrodes includes a base electrode layer and a plating layer.

10. The electronic component according to claim 9, wherein the plating layer includes a Ni plating layer and a Sn plating layer.

11. A method for manufacturing an electronic component comprising the steps of:
    preparing a rectangular or substantially rectangular parallelepiped multilayer body made of dielectric ceramic containing Ti and Ba, the multilayer body having inner electrodes embedded therein, a pair of opposite end surfaces, and four side surfaces connecting the end surfaces to each other;
    forming an oleophobic coating containing BaF on the end surfaces of the multilayer body; and
    immersing the end surfaces of the multilayer body having the oleophobic coating formed thereon into a conductive paste having a viscosity of about 15 Pa·s or less; wherein
    a fluorocarbon gas is used as a coating agent in the step of forming the oleophobic coating.

12. The method for manufacturing the electronic component according to claim 11, wherein the conductive paste contains an alcohol organic solvent as a solvent.

13. The method for manufacturing the electronic component according to claim 12, wherein the conductive paste further contains a glass component of about 30 volume % or more.

14. The method for manufacturing the electronic component according to claim 11, wherein the oleophobic coating is a film that is made of a polymer in which monomers of CF, $CF_2$, $CF_3$, and the BaF are polymerized.

15. The method for manufacturing the electronic component according to claim 14, wherein the BaF is detected as $BaF^+$ by time-of-flight secondary ion mass spectrometry.

16. The method for manufacturing the electronic component according to claim 15, wherein
    the CF is detected as $CF^+$, the $CF_2$ is detected as $CF_2^+$, and the $CF_3$ is detected as $CF_3^+$ by the time-of-flight secondary ion mass spectrometry; and
    the $BaF^+$ is detected more than each of the $CF^+$, the $CF_2^+$, and the $CF_3^+$.

17. The method for manufacturing the electronic component according to claim 16, wherein the $CF_3^+$ is detected more than each of the $CF^+$ and the $CF_2^+$.

18. The method for manufacturing the electronic component according to claim 11, wherein the electronic component is one of a multilayer ceramic capacitor, a piezoelectric component, a thermistor, and an inductor.

19. The method for manufacturing the electronic component according to claim 11, further comprising forming two outer electrodes provided on the pair of end surfaces; wherein
    at least a portion of an exposed portion of each of the four side surfaces between the outer electrodes is covered with the oleophobic coating.

* * * * *